(12) United States Patent
Taki et al.

(10) Patent No.: US 10,708,489 B2
(45) Date of Patent: Jul. 7, 2020

(54) CONTROL DEVICE, MONITORING SYSTEM, MONITORING CAMERA CONTROL METHOD, AND STORAGE MEDIUM

(71) Applicant: KYOCERA Document Solutions Inc., Osaka (JP)

(72) Inventors: Kosuke Taki, Osaka (JP); Yoichi Hiranuma, Osaka (JP); Fumiya Sakashita, Osaka (JP); Shoichi Sakaguchi, Osaka (JP); Shohei Fujiwara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/363,861

(22) Filed: Mar. 25, 2019

(65) Prior Publication Data
US 2019/0306409 A1 Oct. 3, 2019

(30) Foreign Application Priority Data
Mar. 29, 2018 (JP) .................. 2018-063966

(51) Int. Cl.
*H04N 5/225* (2006.01)
*H04N 5/232* (2006.01)

(52) U.S. Cl.
CPC ..... *H04N 5/23219* (2013.01); *H04N 5/23299* (2018.08)

(58) Field of Classification Search
CPC .... G06K 9/00771; G06K 9/3241; G06K 9/52; G06K 9/46; G06K 9/6215; G06K 9/6202; G06K 2009/3291; G06K 2009/4666; G06K 7/10366; G06K 9/00295; H04N 5/91; H04N 7/18
USPC ......................... 348/143–160, 169
See application file for complete search history.

(56) References Cited

U.S. PATENT DOCUMENTS 10,248,868 B2 * 4/2019 Oami ................ G06K 9/00771

FOREIGN PATENT DOCUMENTS

JP 2008-109552 A 5/2008

* cited by examiner

*Primary Examiner* — Masum Billah
(74) *Attorney, Agent, or Firm* — Studebaker & Brackett PC

(57) ABSTRACT

A control device includes a detection section, a determination section, and a controller. The detection section detects a tracking state of an image capturing device that tracks a tracking target object. The determination section determines a control option of the image capturing device. The controller controls the image capturing device according to the control option. The determination section determines the control option based on a change location where the tracking state with respect to the tracking target object has changed.

16 Claims, 15 Drawing Sheets

CONTROL DEVICE, MONITORING SYSTEM, MONITORING CAMERA CONTROL METHOD, AND STORAGE MEDIUM

INCORPORATION BY REFERENCE

The present application claims priority under 35 U.S.C. § 119 to Japanese Patent Application No. 2018-063966, filed on Mar. 29, 2018. The contents of this application are incorporated herein by reference in their entirety.

BACKGROUND

The present disclosure relates to a control device, a monitoring system, a monitoring camera control method, and a storage medium.

In a situation in which a camera tracks a tracking target object, the camera terminates tracking target object tracking when a preset tracking set period elapses. Even within the tracking set period, the camera terminates tracking target object tracking when the camera loses the tracking target object to become incapable of tracking the tracking target object. For example, an image capturing device having a tracking function is examined. In a situation in which there are a plurality of candidate tracking target objects, the image capturing device having the tracing function may select one of the candidate tracking target objects to effectively perform a tracing process.

SUMMARY

A control device according to an aspect of the present disclosure includes a detection section, a determination section, and a controller. The detection section detects a tracking state of an image capturing device that tracks a tracking target object. The determination section determines a control option of the image capturing device. The controller controls the image capturing device according to the control option. The determination section determines the control option based on a change location where the tracking state with respect to the tracking target object has changed.

A monitoring system according to an aspect of the present disclosure includes an image capturing device and a control device. The control device includes a detection section, a determination section, and a controller. The detection section detects a tracking state of the image capturing device that tracks a tracking target object. The determination section determines a control option of the image capturing device. The controller controls the image capturing device according to the control option. The determination section determines the control option based on a change location where the tracking state with respect to the tracking target object has changed.

A monitoring camera control method according to an aspect of the present disclosure includes: detecting a tracking state of an image capturing device that tracks a tracking target object; determining a control option of the image capturing device based on a result of detection of the tracking state; and controlling the image capturing device according to the control option. In the determining, the control option is determined based on a change location where the tracking state with respect to the tracking target object has changed.

A storage medium according to an aspect of the present disclosure is a non-transitory computer-readable storage medium storing therein a program for execution of the following operation by a computer. The operation includes: detecting a tracking state of an image capturing device that tracks a tracking target object; determining a control option of the image capturing device based on a result of detection of the tracking state; and controlling the image capturing device according to the control option. In the determining, the control option is determined based on a change location where the tracking state with respect to the tracking target object has changed.

DETAILED DESCRIPTION

Figure 1:
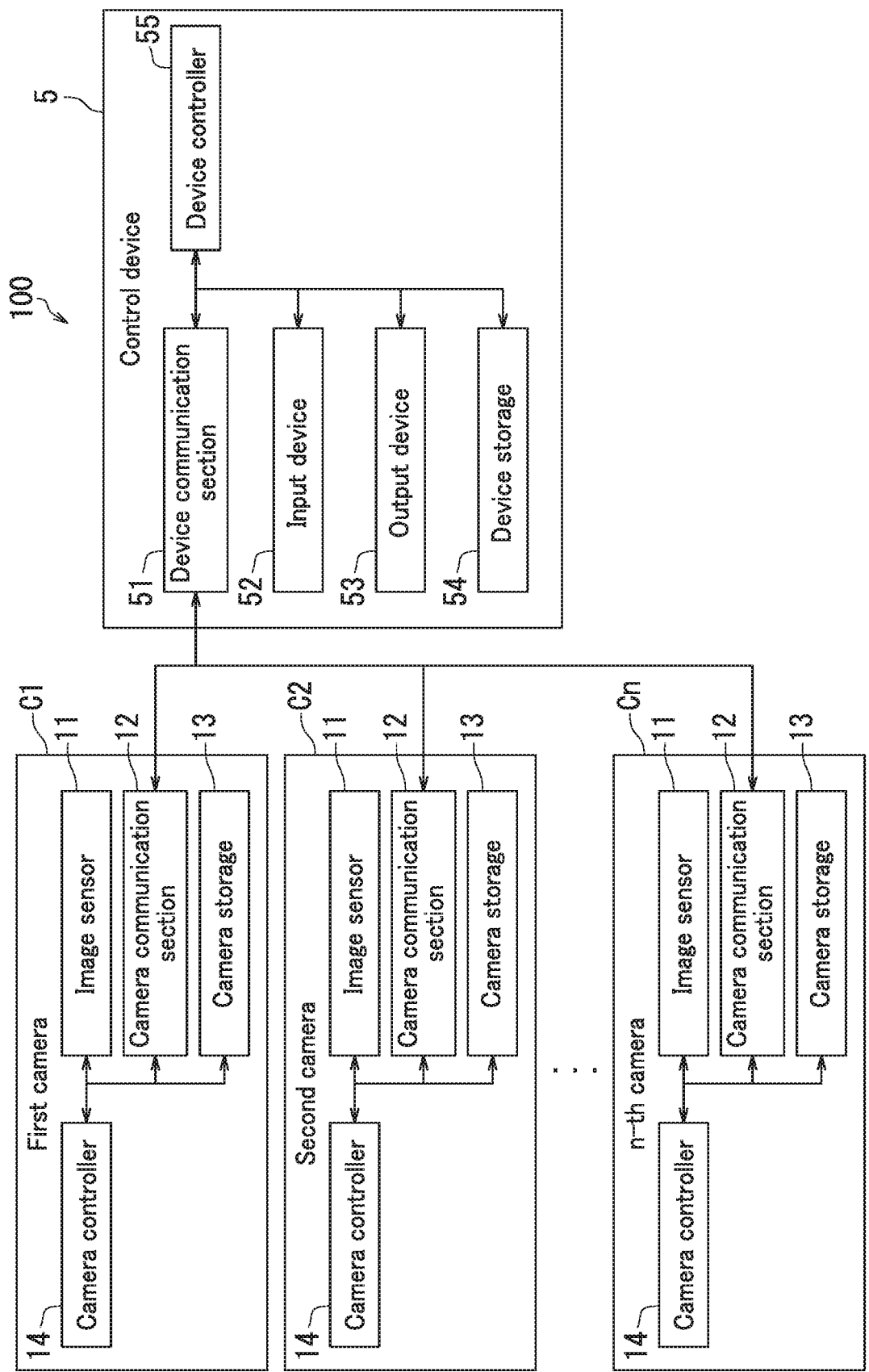
FIG. 1 is a block diagram illustrating a configuration of a monitoring system according to a first embodiment of the present disclosure.

The following describes a monitoring system according to embodiments of the present disclosure with reference to the accompanying drawings. It should be noted that elements in the drawings that are the same or equivalent are labelled using the same reference signs and description thereof is not repeated.

First Embodiment

Cameras each are controlled based on a change location where a tracking state with respect to a tracking target object has changed in a first embodiment. The cameras are also controlled according to presence or non-presence of a person holding the tracking target object in the first embodiment.

The following first describes a monitoring system 100 according to the first embodiment of the present disclosure with reference to FIG. 1. FIG. 1 is a block diagram illustrating a configuration of the monitoring system 100 according to the first embodiment. The monitoring system 100 according to the first embodiment controls a plurality of cameras C1 to Cn to track the tracking target object. The tracking target object is a target object capable of being carried away. For example, the tracking target object is a painting. Alternatively, the tracking target object may be a fire extinguisher installed in a building. The cameras C1 to Cn may track a person.

As illustrated in FIG. 1, the monitoring system 100 includes the cameras C1 to Cn and a control device 5. The cameras C1 to Cn each are an example of an image capturing device.

Each of the cameras C1 to Cn tracks the tracking target object. Once one of the cameras C1 to Cn captures an image of a preset tracking target object, states of the cameras C1 to Cn change from a normal state to a tracking state. The cameras C1 to Cn in the tracking state each move a range of an image of an imaging area captured by a corresponding one of the cameras C1 to Cn by following movement of the tracking target object. For example, each of the cameras C1 to Cn moves the range of the image of the imaging area such that the tracking target object is located at the center of the imaging area within a range where the imaging area is movable. Alternatively, each of the cameras C1 to Cn may capture an image of the imaging area by enlarging or contracting the imaging area.

Tracking information necessary for tracking is set in each of the cameras C1 to Cn. The tracking information contains a tracking parameter necessary for tracking. The tracking information includes information about the tracking target object to be tracked. Tracking target object information for identifying the tracking target object is set in each of the cameras C1 to Cn. The tracking target object information herein is information used for tracking the tracking target object included in the captured image captured by each camera. Examples of the tracking parameter include either or both color and shape of a specific tracking target object. The tracking target object information also includes information about an installation range where the tracking target object is to be installed.

The tracking information may also include tracking target person information about a person moving with the tracking target object. The tracking target person information may be pre-registered likewise for the tracking target object. Alternatively, the tracking target person information may be acquired by identifying a person moving with the tracking target object in the captured image and extracting information about the identified person in the captured image.

The tracking target person information may be information about a face of a specific person who is a target for tracking or information about a full-length figure of the specific person. In a case for example where the tracking target person information is information about the face of the specific person, the tracking target person information contains a tracking parameter necessary for tracking the face. Examples of such a tracking parameter include size, position, direction, and inclination of the face of the specific person. Alternatively, the tracking parameter includes size and positions of eyes, nose, and mouth and a ratio therebetween. In a case for example where the tracking target person information is information about the full-length figure of the specific person, the tracking target person information contains a tracking parameter necessary for tracking the full-length figure of the specific person. Examples of such a tracking parameter include height, aspect ratio, clothing color, clothing type, and sex of the tracking target person.

The cameras C1 to Cn each include an image sensor 11, a camera communication section 12, camera storage 13, and a camera controller 14. The cameras C1 to Cn have the same configuration and function in the first embodiment. The following describes a configuration and a function of the camera C1.

The image sensor 11 captures an image of a specific imaging area. The image sensor 11 generates data indicating the captured image and transmits the generated data to the camera controller 14. The image sensor 11 is for example a charge-coupled device (CCD) image sensor or a complementary metal-oxide-semiconductor (CMOS) image sensor.

The camera communication section 12 is capable of communicating with an electronic device equipped with a communication device that uses the same communication scheme (protocol) as the camera communication section 12. The camera communication section 12 communicates with the control device 5 through a network such as a local area network (LAN). The camera communication section 12 is for example a communication module (communication apparatus) such as a LAN board. The camera communication section 12 transmits captured image date to the control device 5 in the first embodiment. The camera communication section 12 also transmits information indicating a tracking state of the cameras C1 to Cn to the control device 5.

The camera storage 13 stores therein various data such as the captured image data. The camera storage 13 includes semiconductor memory. The semiconductor memory includes for example random-access memory (RAM) and read-only memory (ROM).

The camera storage 13 stores the tracking information therein. For example, the camera storage 13 stores the tracking target object information about the tracking target object as the tracking information, in an example, the tracking target object is installed in any of the imaging areas of the respective cameras C1 to Cn. The camera storage 13 may further store information about a specific person as the tracking information.

The camera controller 14 controls operation of each element of the camera C1 by executing a camera control program stored in the camera storage 13. The camera controller 14 includes for example a processor such as a micro processing unit (MPU).

The camera controller 14 tracks the tracking target object based on the captured image data. The camera controller 14 detects change between captured images by for example background subtraction. Alternatively, the camera controller 14 detects change between the captured images by inter-frame differencing. Through detection of change between captured images, the camera controller 14 determines whether or not the captured image in which the change is detected includes the tracking target object. When the captured image includes the tracking target object, the camera controller 14 starts tracking the tracking target object.

As described above, once change (i.e., movement) of the tracking target object included in the captured image is detected, the camera controller 14 starts tracking the tracking target object. The camera controller 14 also determines which of a detection tracking state or a non-detection tracking state the tracking state is according to the captured image. The detection tracking state is a state in which movement of the tracking target object is being detected. By contrast, the non-detection tracking state is a state in which movement of the tracking target object is not being detected. For example, in a situation in which the tracking target object is moving, the camera controller 14 determines that the tracking state is the detection tracking state to continue tracking target object tracking. By contrast, when movement of the preset tracking target object stops or the tracking target object moves out of the imaging area, the camera controller 14 determines that the tracking state is the non-detection tracking state.

The camera controller 14 even in the non-detection tracking state may continue tracking target object tracking for a specific period. The specific period may for example be three minutes or five minutes. For example, even the tracking target object that once stops its movement may resume the movement. Alternatively, even the tracking target object that once moves out of the imaging area may return to the imaging area. For the reason as above, the camera controller 14 continues tracking target object tracking even when change in the tracking target object is not detected. Thus, the tracking target object resuming the movement or re-entering the imaging area can be tracked.

The camera controller 14 in the tracking state may identify a person holding the tracking target object. In a configuration in which the camera controller 14 identifies a person, the camera controller 14 preferably determines presence or non-presence of the person regardless of change between captured images. The control device 5 is capable of controlling the tracking state in which the camera controller 14 tracks the tracking target object.

The control device 5 includes a device communication section 51, an input device 52, an output device 53, device storage 54, and a device controller 55. The control device 5 is for example a server.

The device communication section 51 is capable of communicating with an electronic device equipped with a communication device that uses the same communication scheme (protocol) as the device communication section 51. The device communication section 51 communicates with each camera communication section 12 through the network such as a LAN. The device communication section 51 is for example a communication module (communication apparatus) such as a LAN board. The device communication section 51 receives the captured image data from each camera communication section 12 in the first embodiment. The device communication section 51 also receives information indicating the tracking states of the respective cameras C1 to Cn from the cameras C1 to Cn.

The input device 52 receives an input of a user instruction to the control device 5. The input device 52 includes a touch sensor in the first embodiment. The input device 52 may alternatively include a keyboard and a mouse.

The output device 53 outputs the captured images of the cameras C1 to Cn. Specifically, the output device 53 may output the captured images while switching the captured images of the cameras C1 to Cn. Alternatively, the output device 53 may output the captured images of the cameras C1 to Cn individually on the same display screen. The output device 53 includes a display such as a liquid-crystal display.

The device storage 54 stores therein various data such as the captured image data. The device storage 54 includes a storage device and semiconductor memory. The storage device includes for example either or both a hard-disk drive (HDD) and a solid-state drive (SD). The semiconductor memory includes for example RAM and ROM.

Note that the device storage 54 may store a device control program therein. The device storage 54 may further store therein a monitoring program as a part of the device control program.

Alternatively, the monitoring program may be stored in a storage element other than the device storage 54. For example, the monitoring program is stored in a non-transitory computer-readable storage medium. The non-transitory computer-readable storage medium includes ROM, RAM, CD-ROM, a magnetic tape, a magnetic disk, or an optical data storage device.

The device storage 54 stores therein areas (gateway areas) though which outside is accessible from the imaging areas of the respective cameras C1 to Cn. The gateway areas each are an area of the imaging area where a corresponding one of the cameras C1 to Cn is capable of image capture that is a junction with an imaging incapable area where the corresponding one of the cameras C1 to Cn is incapable of image capture. For example, the gateway areas may each be an area in the vicinity of a door. Alternatively, the gateway areas may each be an area in the vicinity of a wall or a hole.

The device controller 55 controls operation of each section of the control device 5 by executing the device control program stored in the device storage 54. The device controller 55 includes for example a processor such as a central processing unit (CPU).

The device controller 55 controls continuation of tracking target object tracking by the cameras C1 to Cn. The device controller 55 also controls termination of tracking target object tracking by the cameras C1 to Cn.

When the cameras C1 to Cn are for example in the detection tracking state, the device controller 55 controls the cameras C1 to Cn to continue tracking target object tracking. When the cameras C1 to Cn are in the non-detection tracking state, the device controller 55 also controls the cameras C1 to Cn to continue tracking target object tracking. Note that in the first embodiment, when the tracking state of the cameras C1 to Cn changes at a specific position, the device controller 55 controls the cameras C1 to Cn to terminate tracking target object tracking.

It is preferable to track the tracking target object by all the cameras C1 to Cn. For example, it is preferable that when the camera C1 tracks a given captured tracking target object, the camera C2 also tracks the same tracking target object. However, tracking target object tracking may be performed by the cameras C1 to Cn individually. It is possible for example that the camera C1 tracks a given captured tracking target object while the camera C2 does not track the same tracking target object.

Figure 2:
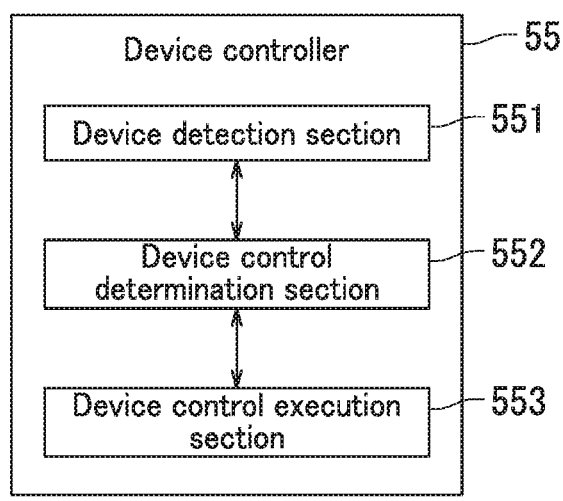
FIG. 2 is a block diagram illustrating a configuration of a device controller of the control device according to the first embodiment of the present disclosure.

The following describes a configuration of the device controller 55 according to the first embodiment of the present disclosure with reference to FIG. 2. FIG. 2 is a block diagram illustrating the configuration of the device controller 55 according to the first embodiment of the present disclosure. The device controller 55 includes a device detection section 551, a device control determination section 552, and a device control execution section 553. The device detection section 551 is an example of what may be referred to as a detection section. The device control determination section 552 is an example of what may be referred to as a determination section. The device control execution section 553 is an example of what may be referred to as a controller.

The device controller 55 performs the same control on the cameras C1 to Cn. For example, when the device controller 55 terminates control on the camera C14, the device controller 55 also terminates control on the other cameras C1 to C13 and C15 to Cn. Furthermore, when the device controller 55 continues control on the camera. C14, the device controller 55 continues control on the other cameras C1 to C13 and C15 to Cn. The following describes the control on the camera C14.

The device detection section 551 detects the tracking state of the camera C14. The device detection section 551 detects the tracking state of the camera C14 based on information indicating the tracking state of the camera C14 received from the camera C14 through the device communication section 51. For example, the device detection section 551 detects that the camera C14 is in the detection tracking state. Alternatively, the device detection section 551 detects that the camera C14 is in the non-detection tracking state.

The device control determination section 552 determines a control option of the camera C14 according to tracking state change in the camera C14. For example, when the device detection section 551 detects that the tracking state of the camera C14 changes from the detection tracking state to the non-detection tracking state, the device control determination section 552 determines a control option of the camera C14.

The device control execution section 553 controls the camera C14 according to the control option determined by the device control determination section 552. When the tracking state of the camera C14 changes from the detection tracking state to the non-detection tracking state, the device control determination section 552 determines a control option based on a change location where the tracking state of the camera C14 has changed. In a situation for example in which the change location is located in the vicinity of a gateway of a building, the device control determination section 552 determines termination of tracking target object tracking by the camera C14.

Note that the device control determination section 552 may determine a control option of the camera C14 according to presence or non-presence of a person holding the tracking target object. In a situation for example in which the change location is not located in the vicinity of the gateway, the device control determination section 552 determines a control option of the camera C14 according to presence or non-presence of a person holding the tracking target object. When a person holding the tracking target object is present, the device control determination section 552 determines continuation of tracking target object tracking by the camera C14. By contrast, when a person holding the tracking target object is not present, the device control determination section 552 determines termination of tracking target object tracking by the camera C14.

The device control determination section 552 may also determine a control option of the camera C14 according to whether or not the change location coincides with a predetermined installation position for the tracking target object. When the change location coincides with the installation position, the device control determination section 552 determines termination of tracking target object tracking by the camera C14. By contrast, when the change location coincides with a position that is not the installation position, the device control determination section 552 determines continuation of tracking target object tracking by the camera C14.

The device control execution section 553 controls the camera C14 according to the control option determined by the device control determination section 552. As described the above, the device controller 55 can terminate tracking target object tracking with appropriate tuning through determination by the device control determination section 552 as to whether tracking by the camera C14 is to be continued or terminated.

Figure 3:
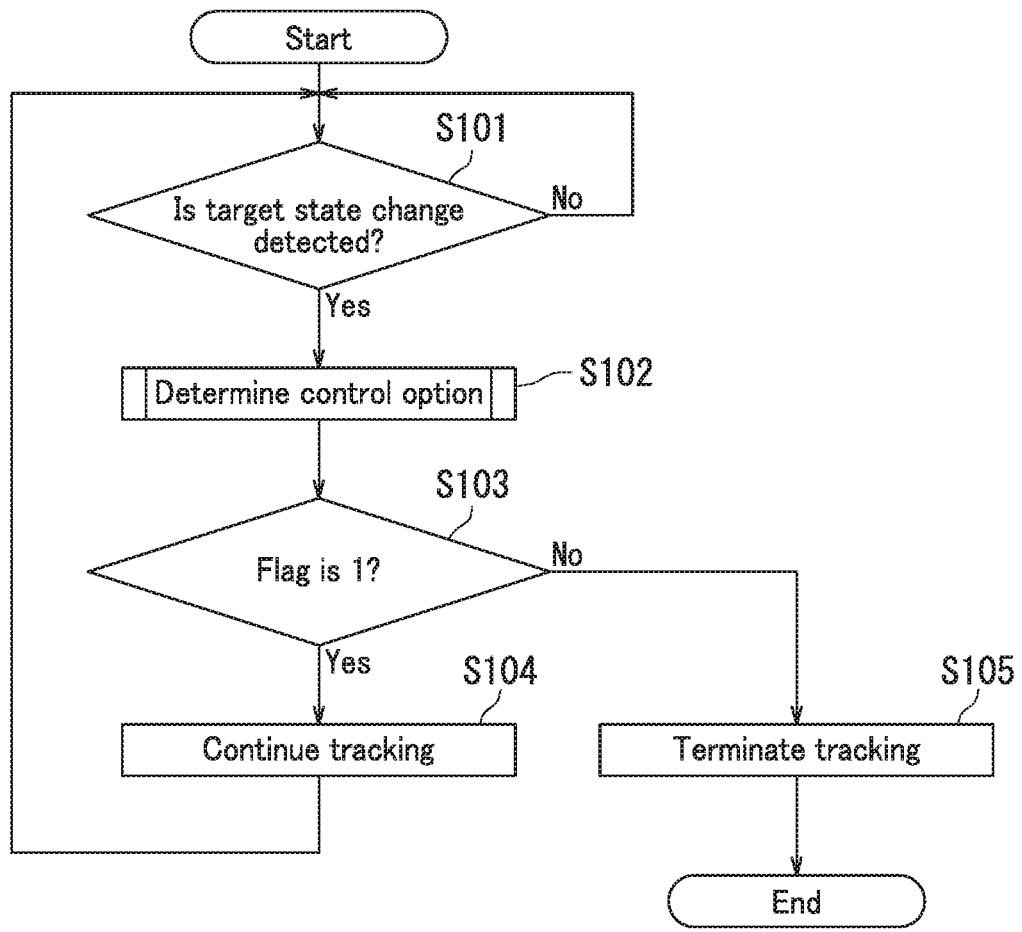
FIG. 3 is a flowchart depicting a tracking control process performed by the control device according to the first embodiment of the present disclosure.
Figure 4:
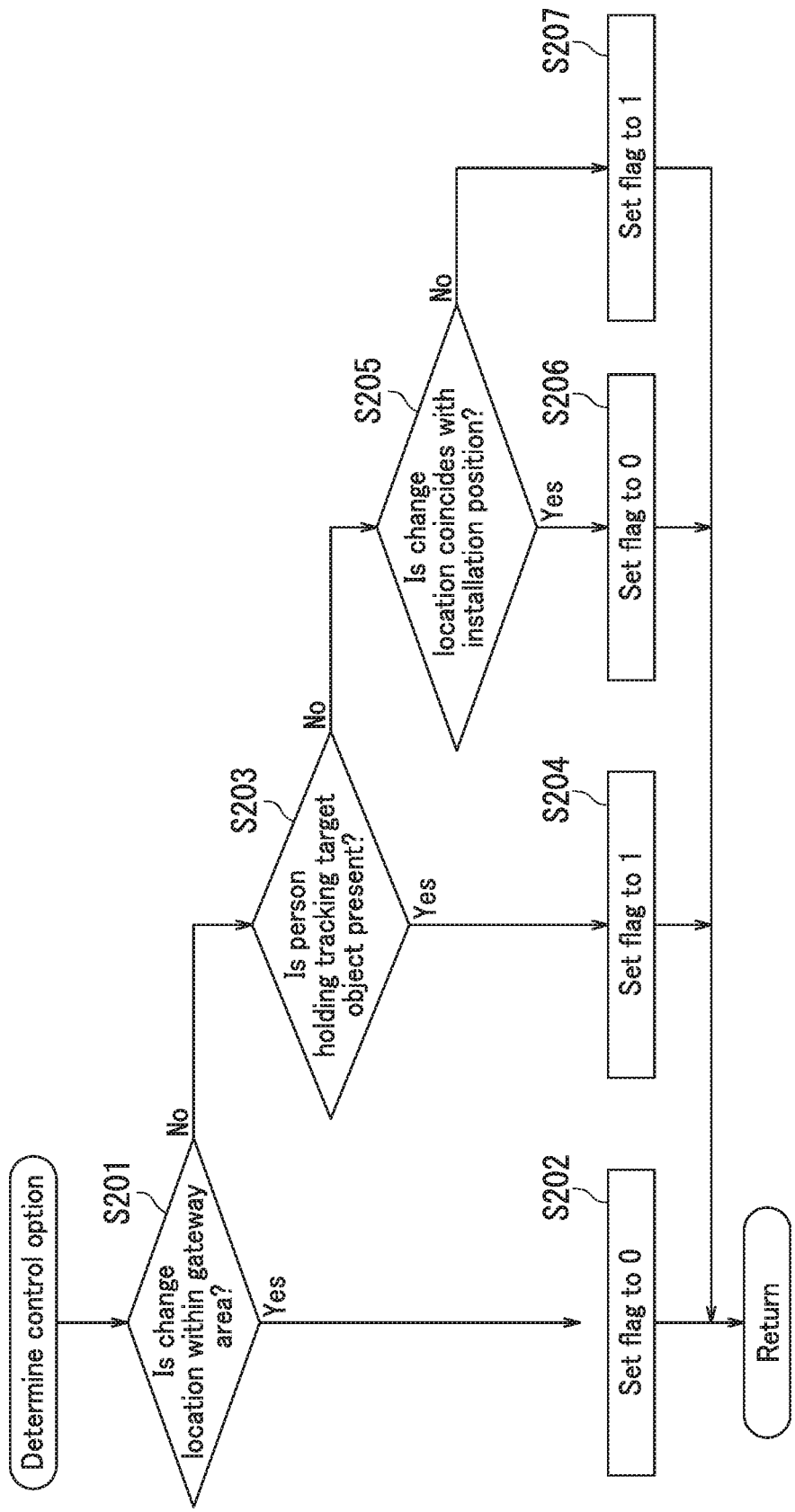
FIG. 4 is a flowchart depicting a determination process of the tracking control process performed by a device control determination section in the control device according to the first embodiment of the present disclosure.

The following describes specific processes performed by the device controller 55 with reference to FIGS. 3 and 4. FIG. 3 is a flowchart depicting a tracking control process performed by the control device 5 according to the first embodiment of the present disclosure. FIG. 4 is a flowchart depicting a determination process of the tracking control process performed by the device control determination section 525 in the control device 5 according to the first embodiment of the present disclosure. For example, the device controller 55 operates in accordance with the flowcharts in FIGS. 3 and 4 in execution of the monitoring program.

When change in the tracking target object is detected in the imaging area of the camera C14, the camera C14 starts tacking target object tracking. When the camera C14 starts tracking target object tracking, the output device 53 displays the captured image captured by the camera C14.

The device control determination section 552 determines whether or not the device detection section 551 detects tracking state change in the camera C14 in Step S101. The tracking state change is change in tracking state of the camera C14. For example, when the camera C14 does not detect the tracking target object, the tracking state of the camera C14 changes from the detection tracking state to the non-detection tracking state.

When the device control determination section 552 determines that the device detection section 551 detects tracking state change (Yes in Step S101), the routine proceeds to Step S102. When the device control determination section 552 determines that the device detection section 551 does not detect tracking state change (No in Step S101), the device control determination section 552 waits until the device detection section 551 detects tracking state change.

The device control determination section 552 determines a control option of the camera C14 in Step S102. For example, the device control determination section 552 determines continuation or termination of tracking target object tracking by the camera C14. The device control determination section 552 sets different values to a flag according to different control options. An example of control option determination by the device control determination section 552 will be described later with reference to FIG. 4.

When the processing in Step S102 is finished, the routine proceeds to Step S103. In Step S103, the device control execution section 553 determines whether or not the flag is 1. The flag represents the control option to be executed by the device control execution section 553 with respect to tracking target object tracking by the camera C14. The flag is binary data taking a value of 0 or 1. The flag taking a value of 0 represents termination of tracking target object tracking by the camera C14. The flag taking a value of 1 represents continuation of tracking target object tracking by the camera C14.

Upon determining that the flag is 1 (Yes in Step S103), the device control execution section 553 causes the camera C14 to continue tracking target object tracking (Step S104). Upon determining that the flag does not indicate 1 (No in Step S103), the device control execution section 553 terminates tracking target object tracking by the camera C14 (Step S105).

Through the above process, the control device 5 can terminate tracking target object tracking by the cameras C1 to Cn with appropriate tuning. Note that the device control determination section 552 may determine termination of the tracking in a situation in which the tracking continues even after a specific period has elapsed from detection of target state change.

The following describes a control option determination process performed h the device control determination section 552 in Step S102 depicted in FIG. 3 with reference to FIG. 4.

In Step S201, the device control determination section 552 determines whether or not a change location where the tracking state has changed is within the gateway area. The gateway area is a predetermined area. For example, the gateway area is an area in front of a gateway of a building on the first floor of the building. When the device control determination section 552 determines that the change location is located within the gateway area (Yes in Step S201), the routine proceeds to Step S202. In Step S202, the device control determination section 552 sets the flag to 0. That is, the device control determination section 552 determines termination of tracking target object tracking by the camera C14.

Note that the change location is located within the gateway area in Step S202, and therefore, it is highly possible that the tracking target object has been taken out of the gateway area. It is not so necessary any more for the camera C14 to track the tracking target object in this situation. The device control determination section 552 accordingly sets the flag to 0. As a result of the device control determination section 552 setting the flag to 0, the device control execution section 553 determines that the flag is not 1 (No in Step S103 in FIG. 3) and terminates tracking by the camera C14 (Step S105 in FIG. 3). The device controller 55 can accordingly terminate tracking target object tracking with appropriate timing.

When movement of the tracking target object is not detected in the vicinity of the gateway of the building, the change location where the tracking state with respect to the tracking target object has changed is located within the gateway area. In this case, it is highly possible that the tracking target object has moved away from the gateway of the building to a place where the camera C14 cannot capture an image. Therefore, termination of tracking target object tracking by the camera C14 allows omission of unnecessary tracking of the tracking target object.

By contrast, when the change location is not located within the gateway area in Step S201 (No in Step S201), the routine proceeds to Step S203. In Step S203, it is determined whether or not a person holding the tracking target object is present. When the device control determination section 552 determines that a person holding the tracking target object is present (Yes in Step S203), the routine proceeds to Step S204.

In Step S204, the device control determination section 552 sets the flag to 1. That is, the device control determination section 552 determines continuation of tracking target object tracking by the camera C14. In Step S204, the tracking state of the camera C14 has changed from the detection tracking state to the non-detection tracking state. The camera C14 accordingly does not detect movement of the tracking target object. However, the camera C14 captures an image of the person holding the tracking target object. In this case, it is though that the person holding the tracking target object stands still in the imaging area of the camera C14. Therefore, continuation of tracking by the camera C14 allows resuming of tracking target object tracking upon the tracking target object resuming moving.

As a result of the device control determination section 552 setting the flag to 1, the device control execution section 553 determines that the flag is 1 (Yes in Step S103). The device control execution section 553 causes the camera C14 to continue tracking target object tracking (Step S104).

By contrast, upon the device control determination section 552 determining that a person holding the tracking target object is not present in Step S203 (No in Step S203), the routine proceeds to Step S205. In Step S205, the device control determination section 552 determines whether or not the change location coincides with an installation position. The installation position is a position where the tracking target object is to be installed. Upon the device control determination section 552 determining that the change location coincides with the installation position (Yes in Step S205), the routine proceeds to Step S206. By contrast, upon the device control determination section 552 determining that the change location does not coincide with the installation position (Yes in Step S205), the routine proceeds to Step S207.

In Step S206, the device control determination section 552 sets the flag to 0. That is, the device control determination section 552 determines termination of tracking target object tracking by the camera C14. In Step S206, the tracking target object has once moved and then is positioned at the installation position where the tracking target object had been originally installed. In this case, the tracking target object coincides with the installation position where the tracking target object is to be originally installed and tracking by the camera. C14 is accordingly terminated.

When the processing in Step S206 is finished, the routine proceeds to Step S103 depicted in FIG. 3. As a result of the device control determination section 552 setting the flag to 0, the device control execution section 553 determines that the flag is not 1 (No in Step S103) and terminates tracking by the camera C14 (Step S105). Thus, the device controller 55 can terminate tracking target object tracking with appropriate timing.

In Step S207, the device control determination section 552 sets the flag to 1. That is, the device control determination section 552 determines continuation of tracking target object tracking by the camera C14. In Step S207, a person holding the tracking target object is not present while the tracking target object does not coincide with the installation position where the tracking target object is to be originally positioned. In this case, tracking by the camera C14 is continued.

As a result of the device control determination section 552 setting the flag to 1, the device control execution section 553 determines that the flag is 1 (Yes in Step S103 in FIG. 3). The device control execution section 553 causes the camera C14 to continue tracking target object tracking (Step S104). Through the above, the device control determination section 552 (see FIG. 2) can perform determination about tracking target object tracking by the camera C14.

Figure 5:
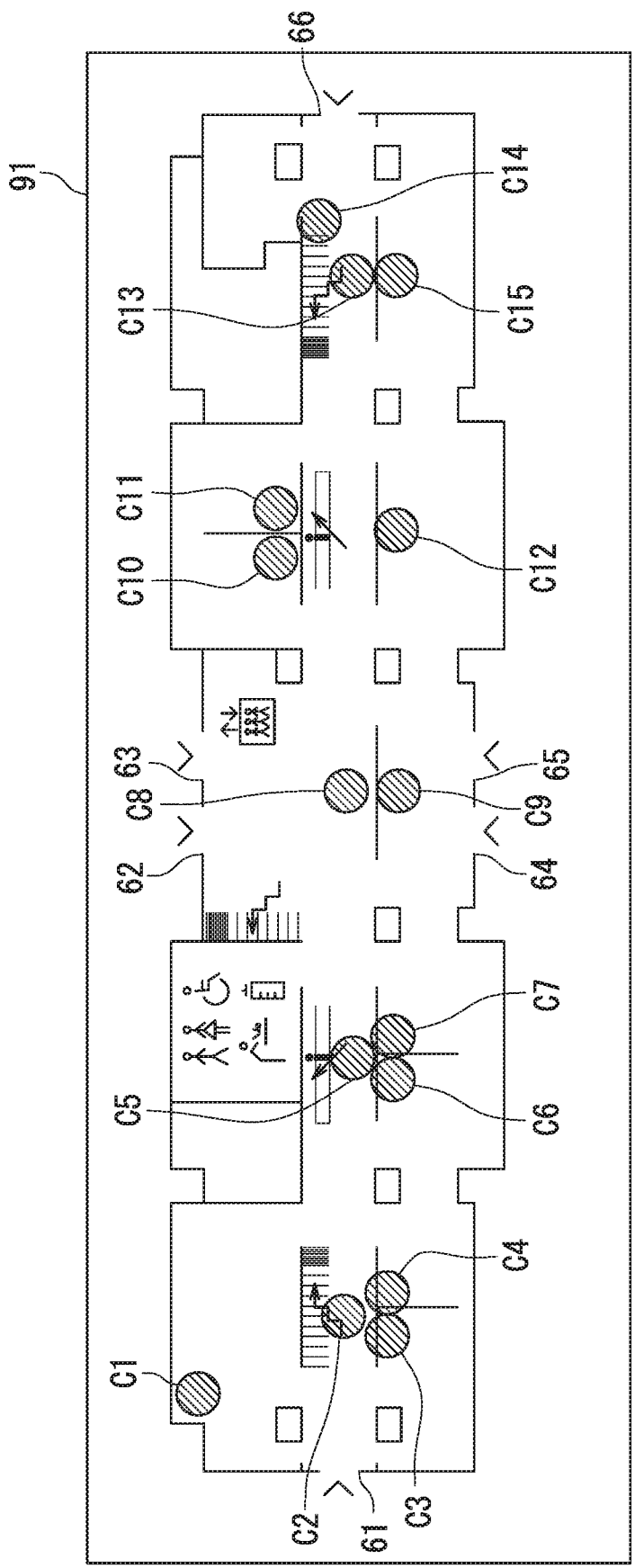
FIG. 5 is a schematic diagram illustrating an example of a layout where a plurality of cameras under control of the control device according to the first embodiment of the present disclosure controls are installed.

The following describes an example of control on the cameras C1 to C15 performed by the control device 5 according to the present embodiment with reference to FIGS. 5 to 12. FIG. 5 is a schematic diagram illustrating an example of a layout of the first floor of a building where the cameras C1 to C15 are installed. On the first floor of the building, the 15 cameras C1 to C15 are installed and there are gateways 62 to 66. The gateways 62 are gateways for the building on the first floor.

Note that the output device 53 (see FIG. 1) may display a screen 91 exhibiting the layout of the first floor of the building. The output device 53 displays the layout of the first floor of the building and the cameras C1 to C15 to show a positional relationship among the cameras C1 to C15.

Through the output device 53 displaying the screen 91, intuitional recognition of the layout of the first floor of the building and the cameras C1 to C15 can be achieved.

Figure 6:
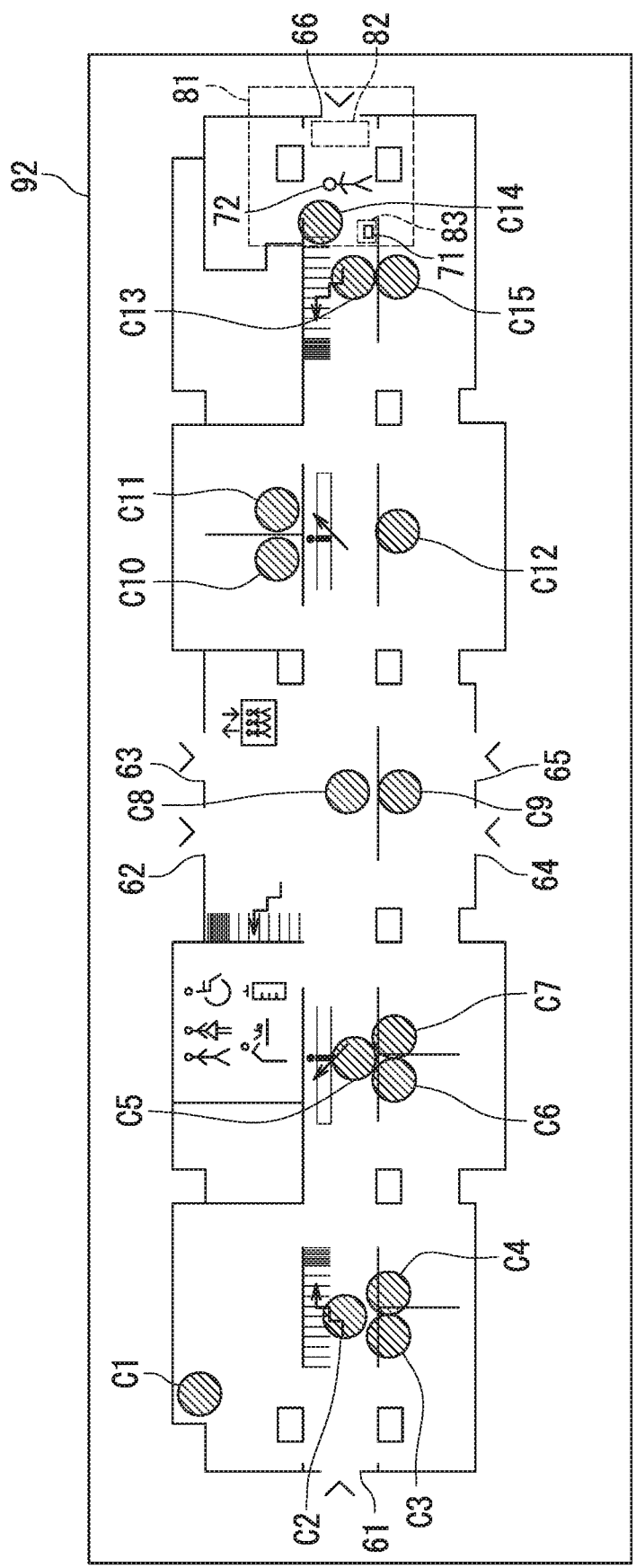
FIG. 6 is a schematic diagram illustrating a tracking target object and a tracking target person in the layout illustrated in FIG. 5.

The following specifically describes tracking state change in the camera C14 with reference to FIGS. 1 to 10. FIG. 6 is a schematic diagram illustrating an example of a tracking target object and a person located on the first floor of the building. FIGS. 7 to 10 are enlarged partial views of FIG. 6. FIGS. 7 to 10 each show a positional relationship between a tracking target object 71 and a gateway area 82.

Figure 7:
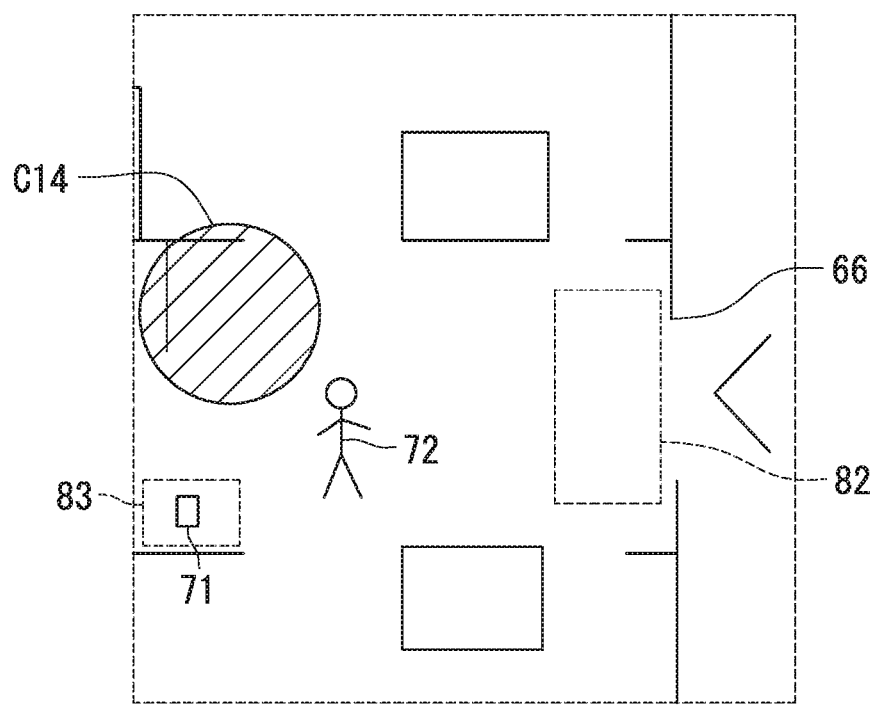
FIG. 7 is a schematic diagram illustrating positions of the tracking target object and the tracking target person.

As illustrated in FIGS. 6 and 7, a person 72 is located in the vicinity of the gateway area 82. The gateway area 82 is stored in the device storage 54 (see FIG. 1). The gateway area 82 is located at the gateway 66. The gateway area 82 is a rectangular area in the vicinity of the gateway 66. A length of the gateway area 82 in a direction parallel to the gateway 66 is defined to be equal to a width of the gateway 66. A length of the gateway area 82 in a direction perpendicular to the gateway 66 is for example one meter. The gateway area 82 can be appropriately set according to the size of the gateway 66.

The tracking target object 71 herein is installed within the imaging area of the camera C14. Specifically, the tracking target object 71 is installed at an installation position 83. Note that the person 72 is present in the vicinity of the tracking target object 71 in FIGS. 6 and 7, but the tracking target object 71 is installed at the installation position 83 apart from the person 72 and does not move. The camera C14 is accordingly in the normal state. In this situation, the process depicted in the flowchart in FIG. 3 does not start.

Figure 8:
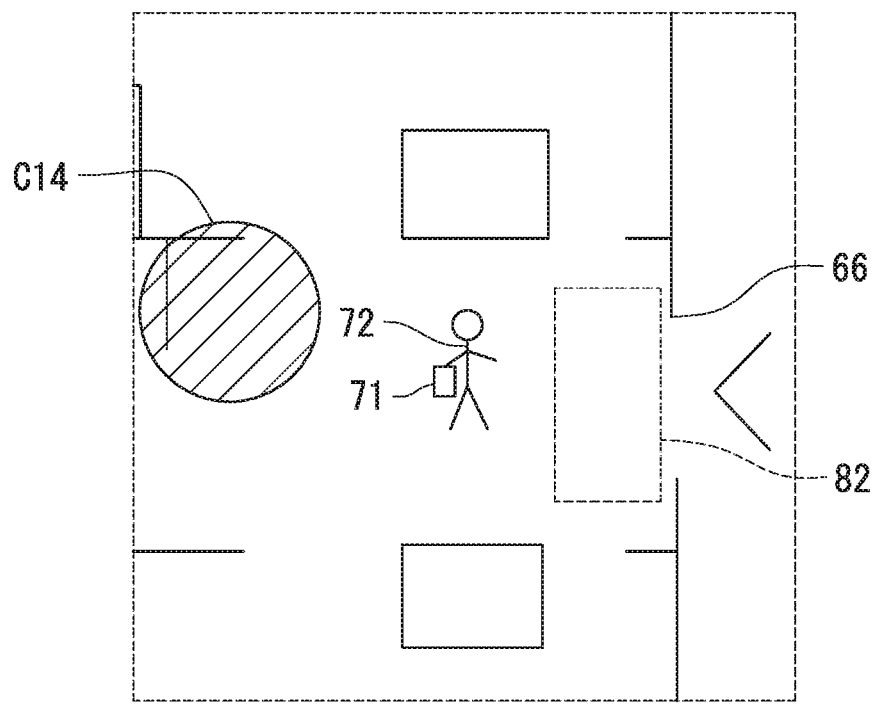
FIG. 8 is a schematic diagram illustrating the positions of the tracking target object and the tracking target person.

As illustrated in FIG. 8, when the person 72 holds the tracking target object 71 71 and starts moving, the camera C14 detects movement of the tracking target object 71 and the state of the camera C14 changes from the normal state to the tracking state. The person 72 holding the tracking target object 71 moves toward the gateway 66 herein. The camera C14 captures images of the tracking target object 71 and the person 72 track the tracking target object 71 and the person 72.

In this situation, the state of the camera C14 changes from the normal state to the tracking state with a result that the process depicted in the flowchart in FIG. 3 starts. The movement of the tracking target object 71 is detected. The camera C14 is accordingly in the detection tracking state. Here, the device control determination section 552 determines that the device detection section 551 does not detect tracking state change in Step S101 in FIG. 3) and waits until the device detection section 551 detects tracking state change.

Figure 9:
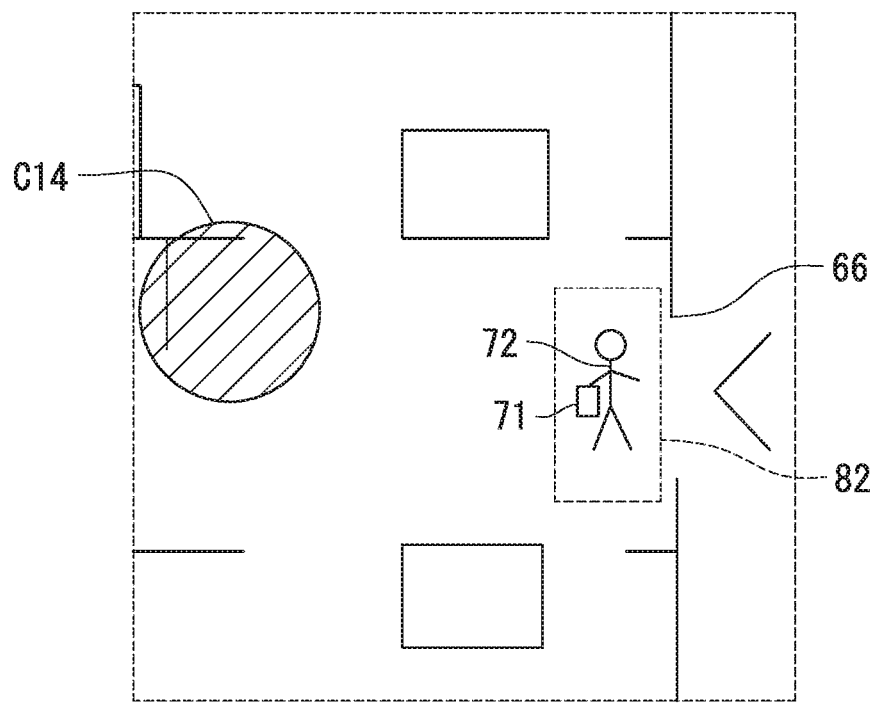
FIG. 9 is a schematic diagram illustrating the positions of the tracking target object and the tracking target person.

As illustrated in FIG. 9, the tracking target object 71 moves into the gateway area 82. The person 72 holding the tracking target object 71 moves and then is located in the gateway area 82 herein. The camera C14 is in the tracking state at this time. Specifically, the camera C14 is in the detection tracking state in which movement of the tracking target object 71 is detected. In also this situation, the device control determination section 552 (see FIG. 2) determines that the device detection section 551 does not detect tracking state change in the camera C14 (No in Step S101 in FIG. 3), and waits until the device detection section 551 detects tracking state change in the camera C14.

Figure 10:
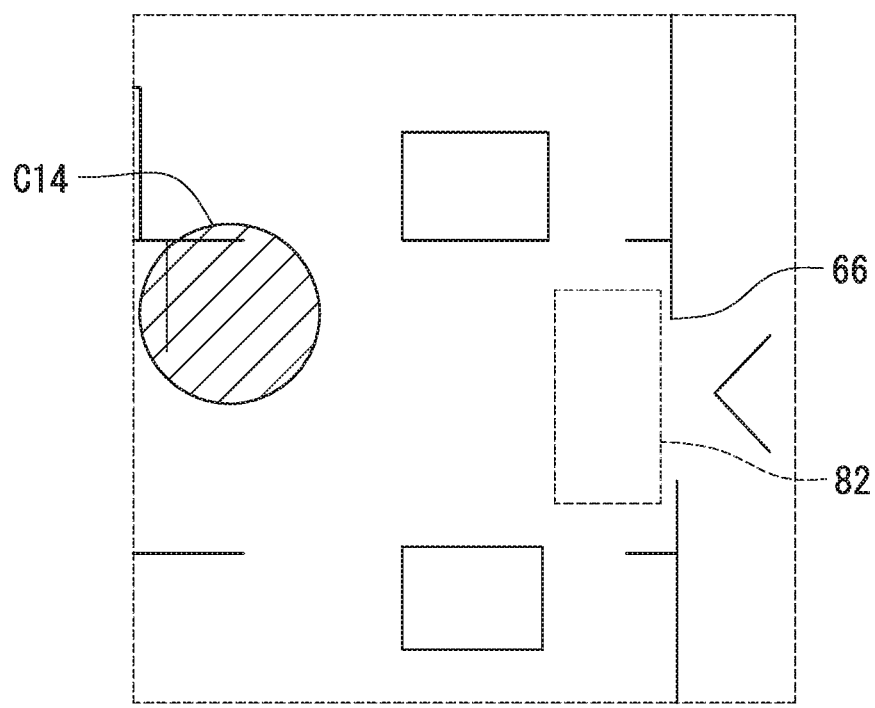
FIG. 10 is a schematic diagram illustrating a location where the tracking target object and the tracking target person had been present.

Thereafter, the tracking target object 71 passes through the gateway area 82 and moves out of the building through the gateway 66 as illustrated in FIG. 10. The person 72 holding the tracking target object 71 moves out of the building herein. In this situation, the camera C14 cannot capture an image of the tracking target object 71 and therefore cannot detect movement of the tracking target object 71. The camera C14 is accordingly in the non-detection tracking state. As described above, the tracking state of the camera C14 changes according to movement of the tracking target object 71.

Upon the device detection section 551 (see FIG. 2) detecting tracking state change, the device control determination section 552 determines that the device detection section 551 has detected the tracking state change (Yes in Step S101 in FIG. 3) and the routine proceeds to Step S102. Then, the device control determination section 552 determines a control option for the camera C14 based on a change location where the tracking state with respect to the tracking target object 71 has changed. The change location with respect to the tracking target object 71 is located in the gateway area 82 (Yes in Step S201 in FIG. 4) herein. The device control determination section 552 accordingly sets the flag to 0 (Step S202 in FIG. 4) and determines termination of tracking target object tracking by the camera C14.

The tracking target object 71 passes through the gateway area 82 and moves out from the gateway 66 in the description with reference to FIGS. 6 to 10, which should not be taken to limit the present disclosure. The tracking target object 71 may not necessarily pass through the gateway area 82 and may be placed inside the building.

Figure 11:
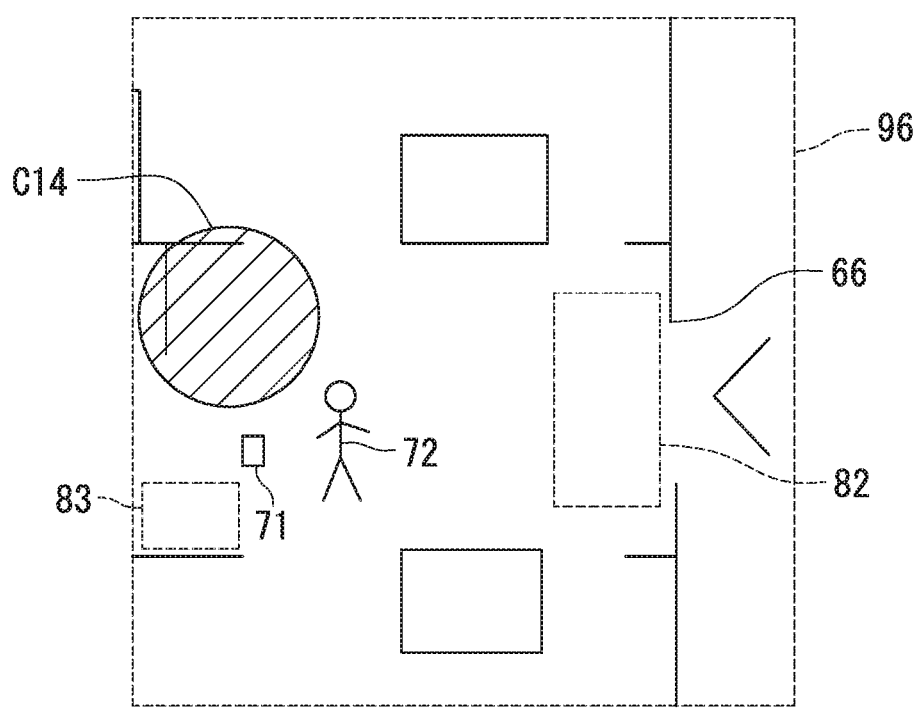
FIG. 11 is a schematic diagram illustrating the positions of the tracking target object and the tracking target person.
Figure 12:
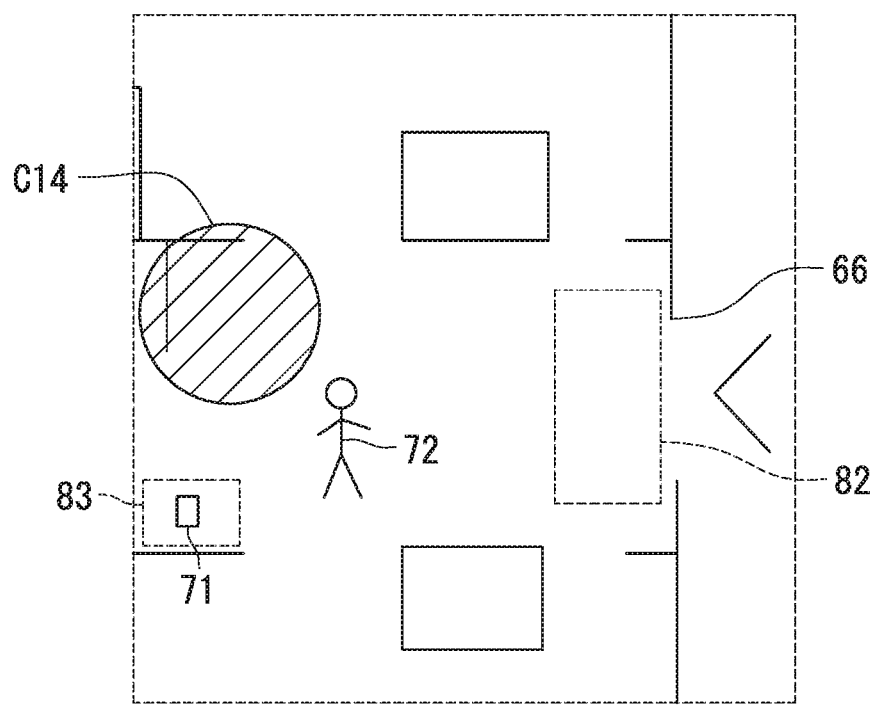
FIG. 12 is a schematic diagram illustrating the positions of the tracking target object and the tracking target person.

The following specifically describes tracking state change in the camera C14 with reference to FIGS. 1 to 8, 11, and 12. FIGS. 11 and 12 are enlarged partial views of FIG. 6. FIGS. 11 and 12 each show a positional relationship between the tracking target object 71 and the gateway area 82.

After moving as illustrated in FIG. 8, the tracking target object 71 is placed in the imaging area of the camera C14 as illustrated in FIG. 11. The person 72 once holds the tracking target object 71 originally installed at the installation position 83, moves, and then places the tracking target object 71 at a position other than the installation position 83. As illustrated in FIG. 11, when the tracking target object 71 is placed at a position other than the installation position 83, the camera C14 continues tracking of the tracking target object 71.

Once the tracking target object 71 is placed, the camera C14 does not detect movement of the tracking target object 71 and accordingly the tracking state of the camera C14 changes from the detection tracking state to the non-detection tracking state. In this situation, the device control determination section 552 determines that the device detection section 551 detects tracking state change (Yes in Step S101 in FIG. 3) and the routine proceeds to Step S102.

Here, the change location with respect to the tracking target object 71 is not located in the gateway area 82 (No in Step S201 in FIG. 4), a person holding the tracking target object 71 is not present (No in Step S203 in FIG. 4), and the change location with respect to the tracking target object 71 does not coincide with the installation position (No in Step S205 in FIG. 4). The device control determination section 552 accordingly determines continuation of tracking by the camera C14 and sets the flag to 1 (Step S207 in FIG. 4).

In this situation, the device control execution section 553 (see FIG. 2) determines that the flag is 1 (Yes in Step S103). The device control execution section 553 causes the camera C14 to continue tracking target object tracking (Step S104 in FIG. 3). Through the above, the device control determination section 552 (see FIG. 2) causes the camera C14 to continue tracking target object tracking.

By contrast, when the tracking target object 71 moves as illustrated in FIG. 8 and then is installed at the installation position 83 as illustrated in FIG. 12, the camera C14 may terminate tracking of the tracking target object 71. Note that the person 72 once holds the tracking target object 71 that has been installed at the installation position 83, moves, and then installs the tracking target object 71 at the installation position 83 herein.

Once the tracking target object 71 is placed, the camera C14 does not detect movement of the tracking target object 71 and accordingly the tracking state of the camera C14 changes from the detection tracking state to the non-detection tracking state. In this case, the device control determination section 552 determines that the device detection section 551 detects tracking state change (Yes in Step S101 in FIG. 3) and the routine proceeds to Step S102.

Here, the change location with respect to the tracking target object 71 is not located in the gateway area 82 (No in Step S201 in FIG. 4), a person holding the tracking target object 71 is not present (No in Step S203 in FIG. 4), and the change location coincides with the installation position (Yes in Step S205). The device control determination section 552 accordingly determines termination of tracking of the tracking target object 71 by the camera C14 and sets the flag to 0 (Step S206 in FIG. 4).

Thereafter, the device control execution section 553 (see FIG. 2) determines that the flag is not 1 (No in step S103 in FIG. 3) and causes the camera C14 to terminate the tracking (Step S105 in FIG. 3). Thus, the device controller 55 can terminate tracking target object tracking with appropriate timing.

Second Embodiment

The following describes a monitoring system 100 according to a second embodiment of the present disclosure with reference to FIGS. 1, 2, and 13 to 15. A monitoring system according to the second embodiment differs from the monitoring system in the first embodiment in that camera control is performed according to the number of security guards who track a tracking target object. An attention will be focused on a control process performed according to the number of security guards in the second embodiment.

The monitoring system 100 according to the second embodiment is the same as the monitoring system 100 according to the first embodiment described with reference to FIGS. 1 and 2 except that the camera storage 13 stores therein security guard information about security guards. As such, repetitive description is omitted to avoid redundancy.

The camera storage 13 (see FIG. 1) of each of the cameras C1 to Cn stores therein security guard information about the security guards. In a case for example in which the security guard information is information about a face of a security guard, the security guard information contains a tracking parameter necessary for tracking the face of the security guard. Examples of the tracking parameter in a case of face tracking include size, position, direction, and inclination of the face of the security guard. Alternatively, the tracking parameter may include size and positions of eyes, nose, and mouth and a ratio therebetween. Alternatively, in a case in which the security guard information is information about a full-length figure of the security guard, the security guard information contains a tracking parameter necessary for tracking the full-length figure of the security guard. Examples of the tracking parameter in a case of tracking of the full-length figure of the security guard include height, aspect ratio, clothing color, clothing type, and sex of the security guard.

Figure 13:
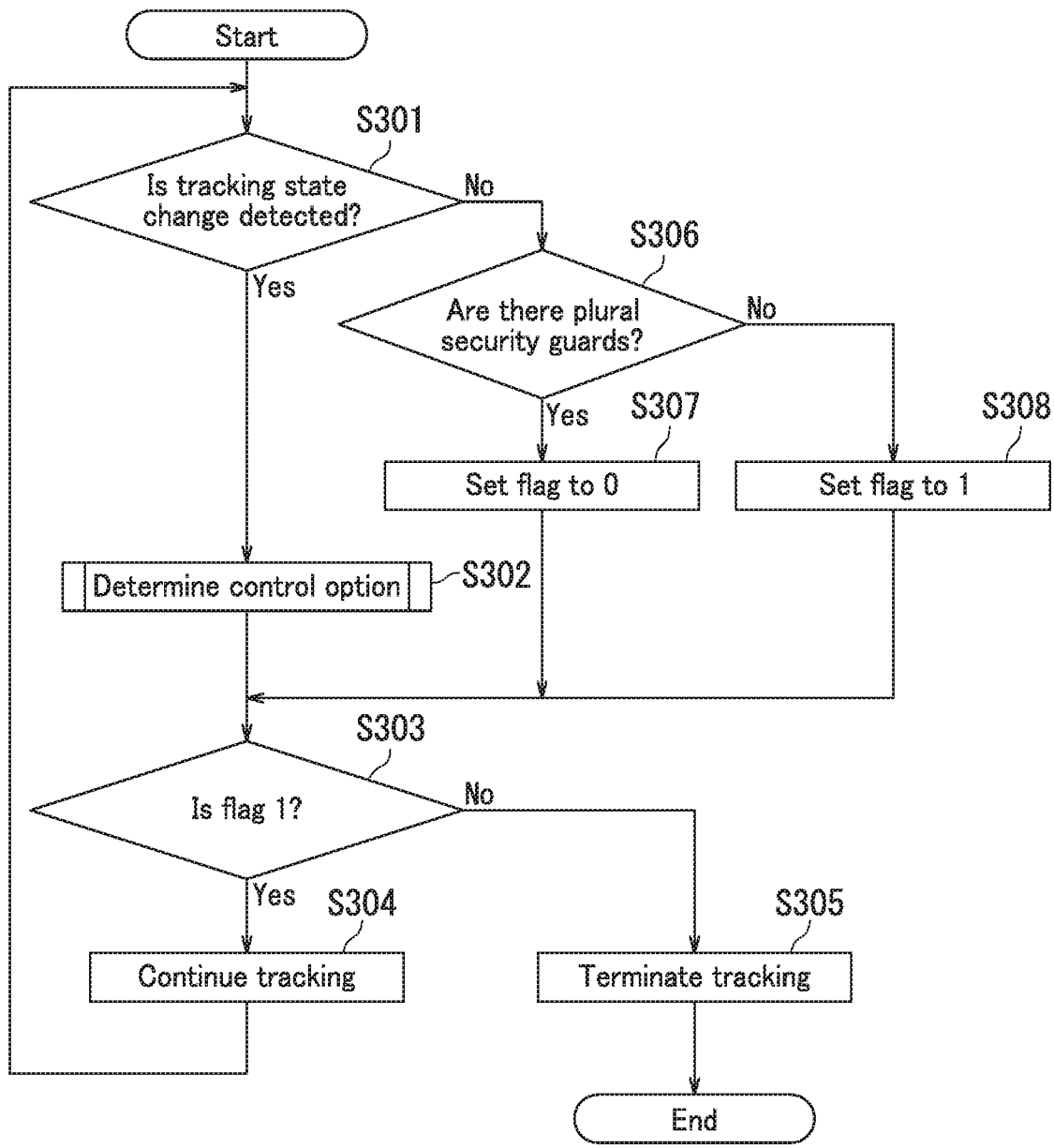
FIG. 13 is a flowchart depicting a tracking control process performed by a control device according to a second embodiment of the present disclosure.

The following describes a tracking control process performed by the control device 5 according to the second embodiment of the present disclosure with reference to FIGS. 1, 2, and 13. FIG. 13 is a flowchart depicting the track control process performed by the control device 5 according to the second embodiment of the present disclosure. Note that Steps S301 to S305 in FIG. 13 are the same as Steps S101 to S105 described with reference to FIG. 3, respectively. In order to avoid redundancy, repetitive description is omitted. However, FIG. 13 includes Steps S306 to S308 in addition to Steps S301 to S305.

The cameras C1 to Cn start tracking target object tracking at a start. Upon detection of a captured image including a tracking target object in any of the cameras C1 to Cn, each of the cameras C1 to Cn starts tracking target object tracking. Note that each of the cameras C1 to Cn starts tracking of a person moving with the tracking target object once identifying the person. Alternatively, each of the cameras C1 to Cn starts tracking of a security guard once capturing an image of the security guard.

Upon detection of tracking state change in Step S301 (Yes in Step S301), the routine proceeds to Step S302. By contrast, upon non-detection of tracking state change in Step S301 (No in Step S301), the routine proceeds to Step S306.

In Step S306, the device control determination section 552 determines whether or not there are plural security guards on guard. When the device control determination section 552 determines that there are plural security guards on guard (Yes in Step S306), the routine proceeds to Step S307. In Step S307, the device control determination section 552 sets the flag to 0. The flag being 0 represents termination of tracking target object tracking by the cameras C1 to Cn. When the processing in Step S307 is finished, the routine proceeds to Step S303.

By contrast, upon the device control determination section 552 determining that there are not plural security guards on guard (No in Step S306), the routine proceeds to Step S308. In Step S308, the device control determination section 552 sets the flag to 1. The flag being 1 represents continuation of tracking target object tracking by the cameras C1 to Cn. When the processing in Step S308 is finished, the routine proceeds to Step S303.

The device control execution section 553 determines whether or not the flag is 1 in Step S303. When the device control execution section 553 determines that the flag is not 1 (No in step S303), the routine proceeds to Step S305. In step S305, the device control execution section 553 causes termination of tracking target object tacking. When the processing in Step S305 is finished, the tracking control process ends.

When the device control execution section 553 determines that the flag is 1 (Yes in step S303), the routine proceeds to Step S304. In step S304, the device control execution section 553 causes continuation of tracking target object tacking. When the processing in Step S304 is finished, the routine returns to Step S301. Note that in this case, the device control determination section 552 may also determine termination of tracking when the tracking continues even after a specific period has elapsed from detection of target state change.

Figure 14:
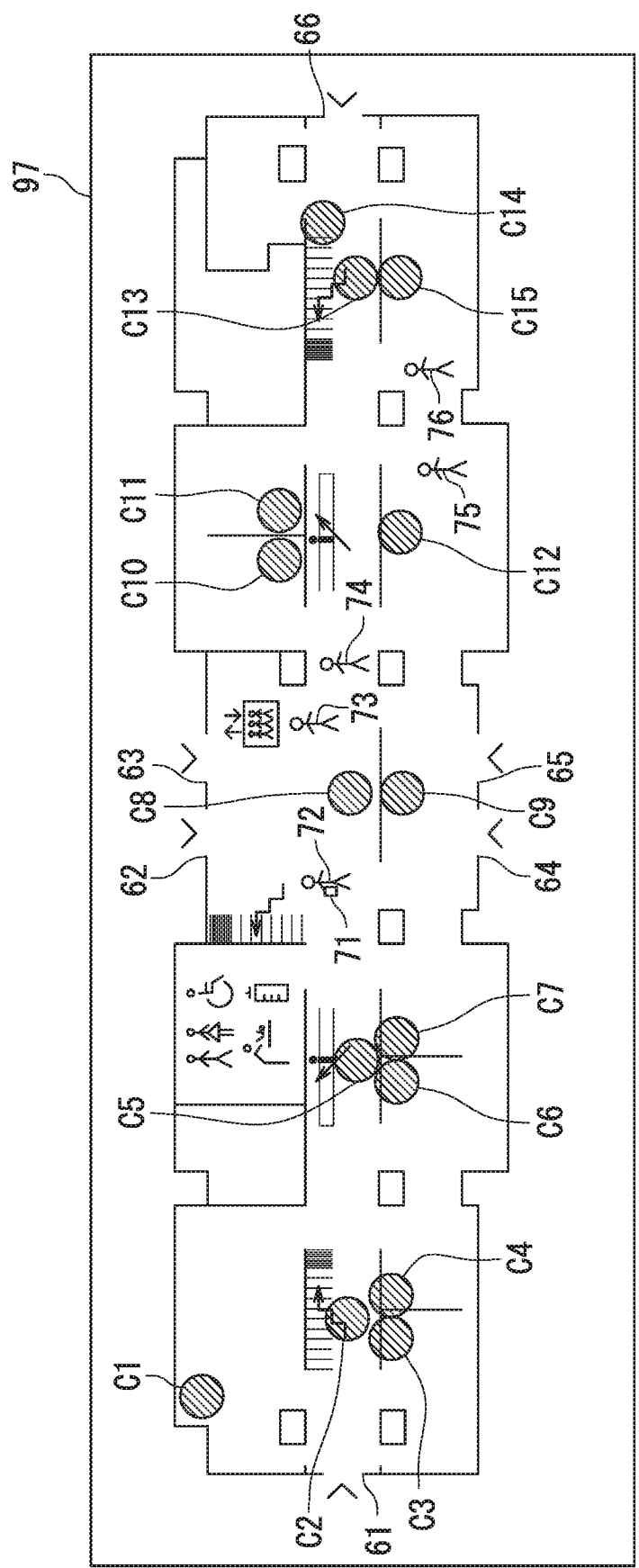
FIG. 14 is a schematic diagram illustrating positions of the tracking target object, the tracking target person, and security guards.

The following specifically describes the processing in Steps S306 and S307 with reference to FIGS. 1, 2, 13, and 14. FIG. 14 is a schematic diagram illustrating a positional relationship among the cameras C1 to Cn under control by the control device 5 and a positional relationship among the tracking target object 71, the person 72, and security guards 73 to 76. Not only the person 72 moving with the tracking target object 71 but also the security guards 73 to 76 are tracked herein. FIG. 14 differs from FIG. 5 in that the security guards 73 to 76 are tracked in addition to the tracking target object 71 and the person 72.

The camera C8 captures an image of the tracking target object 71 and an image of the person 72 to track the tracking target object 71 and the person 72. The camera C8 also captures images of the security guards 73 and 74 to track the security guards 73 and 74. Also, the camera C12 captures an image of the security guard 75 to track the security guard 75. Furthermore, the camera C15 captures an image of the security guard 76 to track the security guard 76.

The device detection section 551 does not detect track state change herein (No in Step S301). The device control determination section 552 (see FIG. 2) accordingly determines whether or not there are plural security guards on guard in Step S306. Here, images of the security guards 73 and 74 are captured and the security guards 73 and 74 are tracked by the camera C8. An image of the security guard 75 is captured and the security guard 75 is tracked by the camera C12. An image of the security guard 76 is captured and the security guard 76 is tracked by the camera C15. The security guards 73 to 76 being tracked by the cameras C1 to C15 means that security is sufficiently heightened through the guards being on guard.

The device control determination section 552 (see FIG. 2) accordingly determines that there are plural security guards on guard (Yes in Step S306). It is unnecessary to further track the tracking target object 71 by the cameras C1 to C15 in a situation in which the security guards 73 to 76 are on guard. The device control determination section 552 accordingly sets the flag to 0 in Step S307. The flag being 0 represents termination of tracking target object tracking by the cameras C1 to Cn. When the processing in Step S307 is finished, the routine proceeds to Step S303.

The device control execution section 553 (see FIG. 2) determines whether or not the flag is 1 in Step S303. The flag is 0 herein. The device control execution section 553 accordingly determines that the flag is not 1 (No in Step S303) and the routine proceeds to Step S305. In step S305, the device control execution section 553 causes termination of tracking target object tacking. When the processing in Step S305 is finished, the tracking control process ends.

Figure 15:
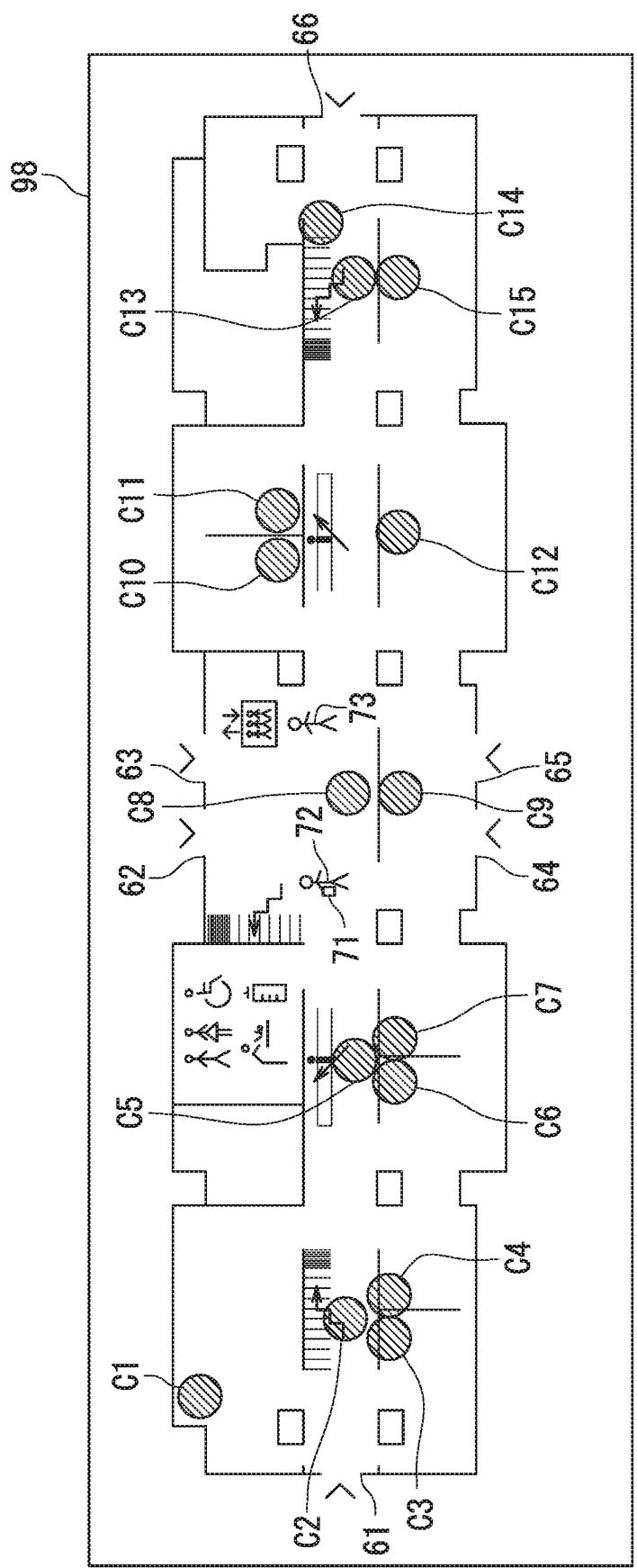
FIG. 15 is a schematic diagram illustrating the positions of the tracking target object, the tracking target person, and the security guards.

The following specifically describes the processing in Steps S306 and S308 with reference to FIGS. 1, 2, 13, and 15. FIG. 15 is a schematic diagram illustrating a positional relationship among the tracking target object 71, the person 72 holding the tracking target object 71, and the security guard 73. Not only the person 72 moving with the tracking target object 71 but also the security guard 73 is tracked herein. FIG. 15 differs from FIG. 5 in that the security guard 73 is tracked in addition to the tracking target object 71 and the person 72. The camera C8 out of the cameras C1 to C15 tracks the single security guard 73 herein.

The camera C8 captures an image of the tracking target object 71 and an image of the person 72 to track the tracking target object 71 and the person 72. The camera C8 also captures an image of the security guard 73 to track the security guard 73.

The device detection section 551 (see FIG. 2) does not detect tracking state change herein (No in Step S301), the device control determination section 552 accordingly determines whether or not there are plural security guards on guard in Step S306. The image of the security guard 73 is captured by the camera C8 and the security guard 73 is tracked by the camera C8 herein. While, the other cameras C1 to C7 and C9 to C15 do not capture an image of any security guards and do not track any security guards.

The device control determination section 552 (see FIG. 2) accordingly determines that there are not plural security guards on guard (No in Step S306). A single security guard being tracked by any of the cameras C1 to C15 means that security may not be sufficiently heightened. In view of the foregoing, in a situation in which there is a single security guard on guard, tracking of the tracking target object 71 by the cameras C1 to C15 is continued. The device control determination section 552 accordingly sets the flag to 1 in Step S307. The flag being 1 represents continuation of tracking target object tracking by the cameras C1 to Cn. When the processing in Step S308 is finished, the routine proceeds to Step S303.

The device control execution section 553 (see FIG. 2) determines whether or not the flag is 1 in Step S303. The flag is 1 herein. The device control execution section 553 accordingly determines that the flag is 1 (Yes in Step S303) and the routine proceeds to Step S304. In step S304, the device control execution section 553 causes continuation of tracking target object tacking. When the processing in Step S304 is finished, the routine returns to Step S301.

The embodiments of the present disclosure have been described so far with reference to the drawings (FIGS. 1 to 15). However, the present disclosure is not limited to the above embodiments and may be implemented in various different forms as other embodiments within the scope not deviating from the essence of the present disclosure. A plurality of elements of configuration disclosed in the above embodiments can be combined as appropriate to form various disclosures. For example, some of the elements of configuration included in the above embodiments may be omitted. The drawings schematically illustrate elements of configuration in order to facilitate understanding and properties of elements of configuration illustrated in the drawings, such as the numbers thereof, may differ from actual properties thereof in order to facilitate preparation of the drawings. Elements of configuration described in the above embodiments are merely examples and are not intended as specific limitations. Various alterations may be made so long as there is no substantial deviation from the effects of the present disclosure.

For example, the matters described in the first and second embodiments can be combined as appropriate. For example, configurations described in the first or second embodiment can be combined as appropriate.

In the above description with reference to FIGS. 5 to 12, 14, and 15, the control device 5 controls the cameras C1 to C15 installed on the same floor of the building, which should not be taken to limit the present disclosure. The control device 5 may control the cameras C1 to Cn installed on different floors of the building. Alternatively, the control device 5 may control the cameras C1 to Cn installed in different buildings.

Furthermore, the control device 5 controls a plurality of cameras in the above description with reference to FIGS. 1, 5, 6, 14, and 15, which should not be taken to limit the present disclosure. The control device 5 may control a single camera.

What is claimed is:

1. A control device comprising:
  a detection section configured to detect a tracking state of an image capturing device that tracks a tracking target object;
  a determination section configured to determine a control option of the image capturing device; and
  a controller configured to control the image capturing device according to the control option, wherein the determination section determines the control option based on a predetermined change location where the tracking state with respect to the tracking target object has changed, when the detection section detects that the tracking state of the image capturing device is a detection tracking state in which movement of the tracking target object is detected by the image capturing device, the determination section determines that the controller is to control the image capturing device to continue tracking the tracking target object, when the detection section detects that the tracking state of the image capturing device has changed at the predetermined change location from the detection tracking state to a non-detection tracking state in which movement of the tracking target object is not detected by the image capturing device, the determination section determines that the controller is to control the image capturing device to terminate tracking of the tracking target object, the determination section determines the control option according to a number of security guards on guard over the tracking target object, the determination section sets a flag value according to the tracking state of the image capturing device, and the controller controls the image capturing device to continue tracking the tracking target object according to the flag value.

2. The control device according to claim 1, wherein when the predetermined change location where the tracking state of the image capturing device has changed from the detection tracking state to the non-detection tracking state is located within a gateway area, the determination section determines termination of tracking of the tracking target object.

3. The control device according to claim 1, wherein the determination section determines the control option according to presence or non-presence of a person holding the tracking target object.

4. The control device according to claim 1, wherein when the change location coincides with an installation position for the tracking target object, the determination section determines termination of tracking of the tracking target object by the image capturing device.

5. A monitoring system comprising:
an image capturing device; and
the control device according to claim 1.

6. A monitoring camera control method comprising:
detecting a tracking state of an image capturing device that tracks a tracking target object;
determining a control option of the image capturing device based on a result of detection of the tracking state; and
controlling the image capturing device according to the control option, wherein
in the determining, the control option is determined based on a predetermined change location where the tracking state with respect to the tracking target object has changed,
in the determining, it is determined to control the image capturing device to continue tracking the tracking target object when it is detected that the tracking state of the image capturing device is a detection tracking state in which movement of the tracking target object is detected by the image capturing device,
in the determining, it is determined to control the image capturing device to terminate tracking of the tracking target object when it is detected that the tracking state of the image capturing device has changed at the predetermined change location from the detection tracking state to a non-detection tracking state in which movement of the tracking target object is not detected by the image capturing device,
in the determining, the determination section determines the control option according to a number of security guards on guard over the tracking target object,
in the determining, the determination section sets a flag value according to the tracking state of the image capturing device, and
in the controlling the image capturing device, the image capturing device is controlled to continue tracking the tracking target object according to the flag value.

7. A non-transitory computer-readable storage medium storing therein a monitoring program for execution by a computer, the monitoring program comprising:
detecting a tracking state of an image capturing device that tracks a tracking target object;
determining a control option of the image capturing device based on a result of detection of the tracking state; and
controlling the image capturing device according to the control option, wherein
in the determining, the control option is determined based on a predetermined change location where the tracking state with respect to the tracking target object has changed,
in the determining, it is determined to control the image capturing device to continue tracking the tracking target object when it is detected that the tracking state of the image capturing device is a detection tracking state in which movement of the tracking target object is detected by the image capturing device, and
in the determining, it is determined to control the image capturing device to terminate tracking of the tracking target object when it is detected that the tracking state of the image capturing device has changed at the predetermined change location from the detection tracking state to a non-detection tracking state in which movement of the tracking target object is not detected by the image capturing device,
in the determining, the determination section determines the control option according to a number of security guards on guard over the tracking target object,
in the determining, the determination section sets a flag value according to the tracking state of the image capturing device, and
in the controlling the image capturing device, the image capturing device is controlled to continue tracking the tracking target object according to the flag value.

8. The control device according to claim 1, wherein the image capturing device includes a plurality of cameras,
when the detection section detects as the detection tracking state a first tracking state in which movement of the tracking target object is detected by at least one of the plurality of cameras, the determination section determines that the controller is to control the plurality of cameras to continue tracking the tracking target object, and
when the detection section detects that the tracking state of the image capturing device has changed at the predetermined change location from the first tracking state to a second tracking state, as the non-detection tracking state, in which movement of the tracking target object is not detected by any of the plurality of cameras, the determination section determines that the controller is to control the plurality of cameras to terminate tracking of the tracking target object.

9. The monitoring camera control method according to claim 6, wherein the image capturing device includes a plurality of cameras, in the determining, it is determined that the controller is to control the plurality of cameras to continue tracking the tracking target object when it is detected as the detection tracking state a first tracking state in which movement of the tracking target object is detected by at least one of the plurality of cameras, and, in the determining, it is determined that the controller is to control the plurality of cameras to terminate tracking of the tracking target object when it is detected that the tracking state of the image capturing device has changed at the predetermined change location from the first tracking state to a second tracking state, as the non-detection tracking state, in which movement of the tracking target object is not detected by any of the plurality of cameras.

10. The non-transitory computer-readable storage medium according to claim 7, wherein the image capturing device includes a plurality of cameras, in the determining, it is determined that the controller is to control the plurality of cameras to continue tracking the tracking target object when it is detected as the detection tracking state a first tracking state in which movement of the tracking target object is detected by at least one of the plurality of cameras, and, in the determining, it is determined that the controller is to control the plurality of cameras to terminate tracking of the tracking target object when it is detected that the tracking state of the image capturing device has changed at the predetermined change location from the first tracking state to a second tracking state, as the non-detection tracking state, in which movement of the tracking target object is not detected by any of the plurality of cameras.

11. The control device according to claim 1, wherein the determination section changes the flag value in response to change of the tracking state of the image capturing device.

12. The monitoring camera control method according to claim 6, wherein the flag value is changed in response to a change of the tracking state of the image capturing device.

13. The non-transitory computer-readable storage medium according to claim 7, wherein in the determining, the flag value is changed in response to a change of the tracking state of the image capturing device.

14. The control device according to claim 1, wherein when the image capturing section identifies a person holding the tracking target object, the determination section determines that the controller is to control the image capturing device to continue tracking the tracking target object.

15. The monitoring camera control method according to claim 6, wherein when the image capturing section identifies a person holding the tracking target object, it is determined to control the image capturing device to continue tracking the tracking target object.

16. The non-transitory computer-readable storage medium according to claim 7, wherein in the controlling, the image capturing device is controlled to continue tracking the tracking target object when the image capturing section identifies a person holding the tracking target object.

\* \* \* \* \*